United States Patent

Soria et al.

[11] Patent Number: 5,143,614
[45] Date of Patent: Sep. 1, 1992

[54] MEMBRANE DEVICE FOR FILTRATION, SEPARATION, OR CATALYTIC REACTION

[75] Inventors: Raymond Soria, Bazet; Jacques Gillot, Laloubere, both of France

[73] Assignee: Societe des Ceramiques Techniques, Bazet, France

[21] Appl. No.: 654,988

[22] Filed: Feb. 14, 1991

[30] Foreign Application Priority Data

Feb. 16, 1990 [FR] France .................. 90 01897

[51] Int. Cl.$^5$ ............................................. B01D 71/04
[52] U.S. Cl. ............................... 210/321.61; 210/450; 210/500.25; 210/500.26
[58] Field of Search ............. 210/450, 500.25, 500.26, 210/496, 510, 321.61

[56] References Cited

U.S. PATENT DOCUMENTS 3,914,358  10/1975  Dixon et al. ...................... 264/41
4,640,774  2/1987  Garcera et al. ................ 210/450 X

FOREIGN PATENT DOCUMENTS 0154295  9/1985  European Pat. Off. .

Primary Examiner—Frank Spear
Attorney, Agent, or Firm—Sughrue, Mion, Zinn Macpeak & Seas

[57] ABSTRACT

A membrane device comprising a macroporous block of sintered material with the pores at each end of the block being filled with a porous sintered material, wherein the porous sintered material comprises at least two types of grain: grains of a first type called "frame" grains having a diameter lying in the range about 1% to about 20% of the diameter of the pores in said block; and grains of a second type called "finishing" grains having a diameter lying in the range about 0.2% to about 20% of the diameter of the frame grains, with the finishing grains being received in the pores defined between the frame grains.

39 Claims, 3 Drawing Sheets

MEMBRANE DEVICE FOR FILTRATION, SEPARATION, OR CATALYTIC REACTION

FIELD OF THE INVENTION

The present invention relates to a membrane device for filtration, separation, or catalytic reaction, the device comprising a macroporous block or "substrate" made of sintered ceramic material, sintered metal, or sintered glass, and pierced by one or more parallel longitudinal channels with a surface covering of membrane which is of finer porosity than the block or which is permeable by diffusion, the membrane being constituted by one or more layers made of organic material, or of sintered ceramic material, or of sintered glass, possibly modified by the addition of substances having catalytic properties. The device further includes means for inserting a fluid to be purified at one end of the channels, means for collecting purified fluid from the side surface of the block, and means for collecting a residual fluid from the other end of the channels.

BACKGROUND OF THE INVENTION

Documents FR-A-2 061 933 and U.S. Pat. No. 4,069,157 disclose filter devices in which the liquid to be filtered arrives via an inlet chamber at an inlet end of the block and flows along the channels to an outlet end and into an outlet chamber; the filtrate passes radially through the channel membranes and then through the block whose pore size is greater than that of the membrane, after which it is collected from the outside of the block; a residual liquid is collected from the outlet chamber and is recycled.

These devices suffer from leaks of the liquid to be filtered at the inlet and outlet ends of the block.

Between the channels at the inlet and outlet faces of the block, the liquid comes into contact with the large pore size block and a certain fraction of the liquid passes through the block to be collected with the filtrate, thereby reducing the purity of the filtrate. High purity can therefore be obtained only by performing a plurality of successive filtering operations. The larger the average diameter of the pores in the macroporous block, the higher the rate of leakage. Pore diameter in the block is generally about 4 $\mu$m to 20 $\mu$m.

The block could be mounted between parallel gaskets, however this gives rise to difficulties of assembly and it does not prevent residual leaks.

Document EP-A-0 154 295 describes a method of reducing leaks by filling the ends of the macroporous block with a microporous ceramic material, i.e. having pores with a diameter of about 1 $\mu$m. However, although the method described does improve the situation, it nevertheless fails to obtain complete leakproofing at the end of the block. In any event, it is completely inadequate for ultrafiltration membranes or, a fortiori, for membranes having an organic separating layer, such as membranes for reverse osmosis or for pervaporation. This is clear in the case of ultrafiltration membranes since their pores have a diameter of not more than 0.1 $\mu$m, i.e. much finer than the pores in the end filling material. If an attempt is made to avoid this problem by filling the end by means of a ceramic material having very small pores obtained by impregnating the end of the block by means of a suspension of very fine particles, it is difficult to control the penetration of such a fine slip into pores that are so large. There are also severe cracking problems due to shrinkage during sintering of the microporous material, and the smaller the particles to be sintered the greater the amount of shrinkage.

An object of the present invention is to provide a membrane separation device and in particular a filter device which enables a high-purity purified fluid to be obtained by leakproofing the ends of the macroporous block effectively and with good mechanical strength.

SUMMARY OF THE INVENTION

The present invention provides a macroporous block of sintered ceramic material, of sintered metal, or of sintered glass, the block being pierced by parallel longitudinal channels whose surfaces are covered by said membrane made of an organic material or a sintered ceramic material or sintered glass, the porosity of the membrane being finer than that of the block, or the membrane being permeable by diffusion, said material optionally being modified by catalyst doping;

means for injecting a fluid to be purified into said channels via first ends thereof;

means for collecting purified fluid from the lateral surface of said block;

means for collecting residual fluid from second ends of said channels;

the pores at both ends of said macroporous block being filled with a porous sintered filler material;

wherein said filler material comprises at least two types of grain: grains of a first type called "frame" grains having a diameter lying in the range about 1% to about 20% of the diameter of the pores of said block; and grains of the second type called "finishing" grains having a diameter lying in the range about 0.2% to about 20% of the diameter of the frame grains, and being received in the pores defined between said frame grains.

The porosity at the ends of the macroporous block is less than 50% and is preferably less than 40% of their initial porosity, i.e. their porosity before filling (with this porosity being measured, for example, by the pycnometric method).

As measured by a mercury porosity meter, the mean diameter of the pores that remain in the end portion of the block that has been leakproofed in this way is not more than 0.5 $\mu$m, and is preferably not more than 0.2 $\mu$m.

Measuring the diameter of the largest through pore using the bubble point method as described by T.H. Meltzer et al. (Bulletin of the Parenteral Drug Association, Vol. 65 (4), 1974, pp. 165-174), shows that this diameter is greatly reduced compared with the ends prior to filling.

The material constituting the frame grains, or the material constituting the finishing grains, or both of them, may be ceramic materials of identical composition to the composition of the macroporous block or of the membrane. If identical to the block, then the membrane device runs little risk of cracking due to thermal stresses during manufacture or to operations such as filtering hot fluids, being cleaned by hot fluids, or being sterilized by steam, since the expansion coefficients of the substrate and of the structural material and/or of the finishing material are the same. The corrosion resistance of the structural and/or finishing materials are likewise as high as that of the substrate material.

Under the frequent circumstance of the macroporous block, the membrane, the frame grains and the finishing grains all being made of materials of the same composition, then the filter element benefits from the coefficients of expansion and the corrosion resistance of all of its constituent materials being equal.

In another embodiment, the finishing grains are made of an organic polymer such as polytetrafluoroethylene.

In a variant of the device of the invention, the porous ceramic material which fills the pores at the ends of the block is made up of three types of grain: grains of a first type called "frame grains" having an average diameter lying in the range about 2% to about 20% of the mean diameter of the pores in the macroporous block, grains of a second type called "intermediate grains" having a mean diameter lying in the range about 2% to about 20% of the mean diameter of the frame grains, and grains of a third type called "finishing grains" having a mean diameter lying in the range about 2% to about 20% of the mean diameter of the intermediate grains.

In another variant of the device of the invention, the frame material and the finishing material, or at least two of the materials constituting the frame grains, the intermediate grains, and the finishing grains, have isoelectric points that differ by at least one unit on the pH scale, and preferably by not less than three units. By way of particularly advantageous example, said macroporous block and the frame grains may be made of alumina, while the finishing grains are made of titanium oxide or of zirconia.

In filter membranes, the purpose of filling the pores at the ends of the substrate in this way is to stop particles or colloids in suspension in the liquid to be filtered. This is achieved either by a geometrical effect with the particles being too large in size to be capable of passing through the succession of irregularly shaped pores constituted by the residual porosity at the ends of the block, or else by an attraction effect between the particles and the surface of the grains used for filling. Such an attraction effect which is well known in so-called "in depth" filtering or in flocculation between particles in suspension in a liquid is related to the surface potential of the filtering material. If this potential is of opposite sign to that of the particle, then the particle is attracted and it attaches to the surface. Surface potentials are characterized by the position of the isolectric point of the material on the pH scale. Such a particle-stopping mechanism is made much more effective if the frame material and the finishing material have significantly different surface potentials.

The accumulation of particles by this mechanism on the surface of the frame grains or of the finishing grains then considerably facilitates clogging up the residual porosity of the leakproofed end by means of these particles, thereby further increasing the effectiveness of the leakproofing.

The present invention also provides a method of filling the pores at the ends of the macroporous block in a membrane device as defined above, wherein the method comprises:

a first step during which a first concentrated deflocculated slip of a frame material powder is prepared, the powder being constituted by particles having a mean diameter lying in the range about 0.5% to about 20% of the mean diameter of the pores of the macroporous block, each of the ends of the macroporous block being successively dipped in said slip which is preferably stirred ultrasonically, dried, and then subjected to frame material consolidation treatment; and a second step during which a second concentrated deflocculated slip of finishing material powder is prepared, the powder being constituted by particles having a mean diameter lying in the range about 0.1% to about 20% of the mean diameter of the frame grains, each of the ends of the macroporous block being dipped in succession in said slip which is preferably stirred ultrasonically, dried, and then subjected to heat treatment for consolidating the finishing material.

When the frame material is a ceramic, the consolidation treatment of said material is sintering. The same applies to the finishing material.

When the material for filling the pores of the macroporous block comprises frame grains, intermediate grains, and finishing grains, the method of filling the pores of the block differs from the method defined above in that it includes an additional step coming after sintering or consolidating the frame material, said step comprising:

preparing a concentrated deflocculated slip of the intermediate grain ceramic material in powder form, preferably constituted by particles having a mean diameter lying in the range about 1% to about 20% of the mean diameter of the frame grains;

dipping each of the ends of the macroporous block in said slip which is preferably stirred ultrasonically; and drying and then sintering or consolidating the intermediate grain material.

In a variant of the method where the frame grains, the intermediate grains (if any), or the finishing grains are ceramic, the powder put into suspension in a slip and from which the intermediate grains and the finishing grains will be derived, is not the ceramic material of these grains in powder form, but is a precursor of this material in power form. For example, when the ceramic material is an oxide, the powder may be hydroxide. During the heat treatment performed after drying, the precursor is transformed into the corresponding ceramic material, and then the ceramic material is sintered.

In another variant of the method, two of the successive filling steps (i.e. the frame step and the finishing step if there are no intermediate grains, or if there are intermediate grains, then either the frame step and the intermediate step or else the intermediate step and the finishing step) are replaced by a single step using a concentrated defloculated slip containing two types of particles corresponding to said two steps, and sintering or consolidation takes at the temperature suitable for consolidating grains of the smaller size.

Any of the steps may be repeated one or more times if the desired filling density is not obtained by performing it once only.

When consolidation is performed by sintering, the frame material is preferably sintered at a temperature and for a duration which are sufficient to ensure that the grains of powder from the slip become firmly bonded to one another and to the grains of the support with which they are in contact. Said temperature and duration should nevertheless be low enough and short enough to limit the phenomenon of grain growth whereby some of the grains grow by absorbing smaller grains, with the mean diameter of frame grains after sintering being no greater than twice and preferably being less than 1.5 times the mean diameter of the particles present in the slip. Satisfying this condition ensures firstly that shrinkage due to frame sintering remains limited, thereby limiting the risk of opening up cracks in the frame, and secondly pore diameter in the frame is controlled, as is necessary to be able to perform the second step properly.

The same rule applies to sintering the intermediate material, if any. The finishing material is also preferably sintered at a temperature and for a duration which are sufficient to ensure that the grains of powder in the slip become firmly bonded to one another and to the frame grains or to the intermediate grains with which they come into contact, while nevertheless not being excessive so that the phenomenon of grain growth remains limited, with the mean diameter of finishing grains after sintering remaining no more than twice and preferably less than 1.5 times the mean diameter of the powder particles present in the slip. Here again the purpose is to limit any tendency to open up cracks due to shrinkage on sintering, and to control the size of the pores formed between the finishing grains or between the finishing grains and the intermediate grains or the frame grains.

The filter element is manufactured by adding the following to the substrate: various porous ceramic structures constituting possible intermediate sublayers between the substrate and the separating layer; the separating layer itself if it is made of ceramic; the frame grains; any intermediate grains; and the finishing grains for leakproofing the end. Each of these structures is sintered at a well-determined temperature. Depending on requirements the operations of installing and sintering the frame grains, and then the intermediate grains and the finishing grains may be performed either before, or after, or between the operations of installing and sintering the filter layers. A single heat treatment may also be used for simultaneously sintering both a filter layer and one of the sizes of leakproofing grains.

BRIEF DESCRIPTION OF THE DRAWINGS

Embodiments of the invention is described by way of example with reference to the accompanying drawings, in which.

DETAILED DESCRIPTION

EXAMPLE 1

Figure 1:
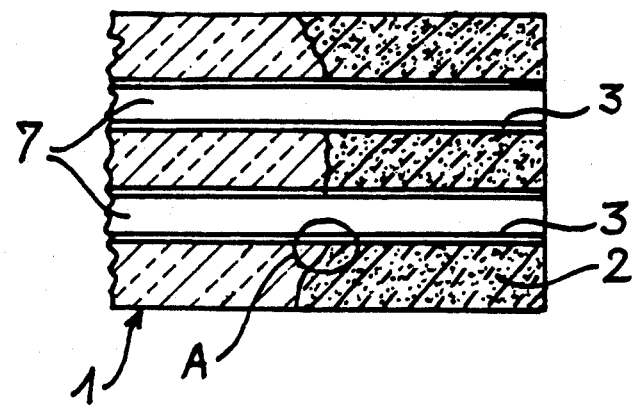
FIG. 1 is a highly diagrammatic longitudinal section view through the end of a filter membrane device of the invention.

FIG. 1 shows a portion of an alumina block 1 in the form of a hexagonal prism having a diameter between flats of 28 mm and a length of 1,020 mm, being pierced by 19 channels having a diameter of 4 mm, i.e. having multichannel geometry, with porosity of 40% and a mean pore diameter of 15 $\mu$m. To leakproof its ends 2, a first slip 10 is prepared of alumina particles having a mean diameter of 2.5 microns. The composition by weight of the slip is:

| alumina: | 63.0% |
|---|---|
| polyacrylic acid: | 0.8% |
| water: | 36.2% |

The polyacrylic acid is used as a wetting agent for deflocculating the alumina.

Figure 2:
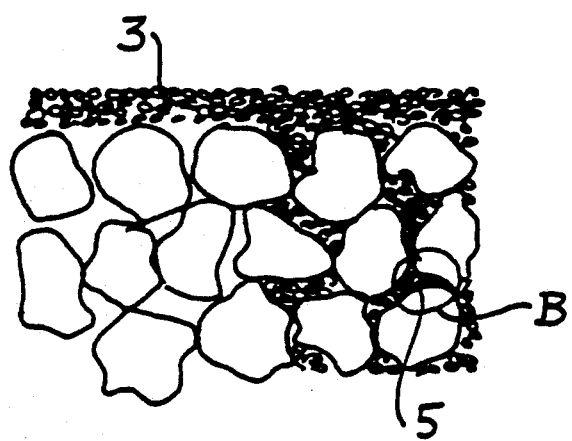
FIG. 2 is a highly diagrammatic view on a larger scale showing a detail A of FIG. 1.
Figure 3:
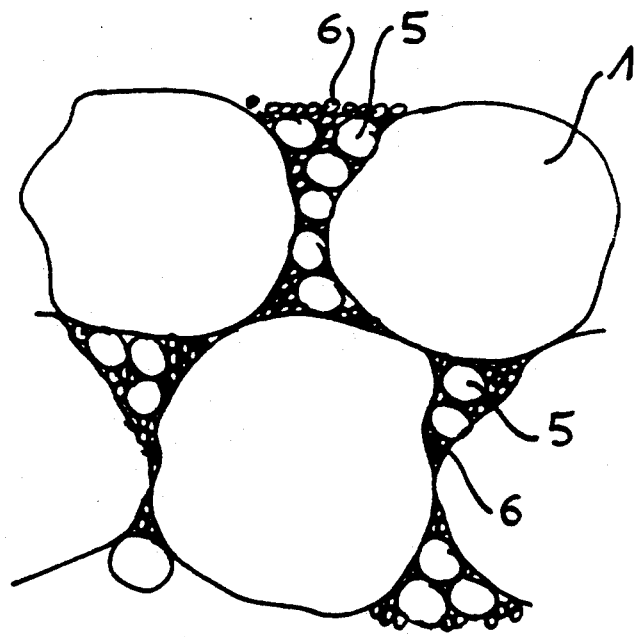
FIG. 3 is a highly diagrammatic view on a larger scale showing a detail B of FIG. 2.
Figure 5:
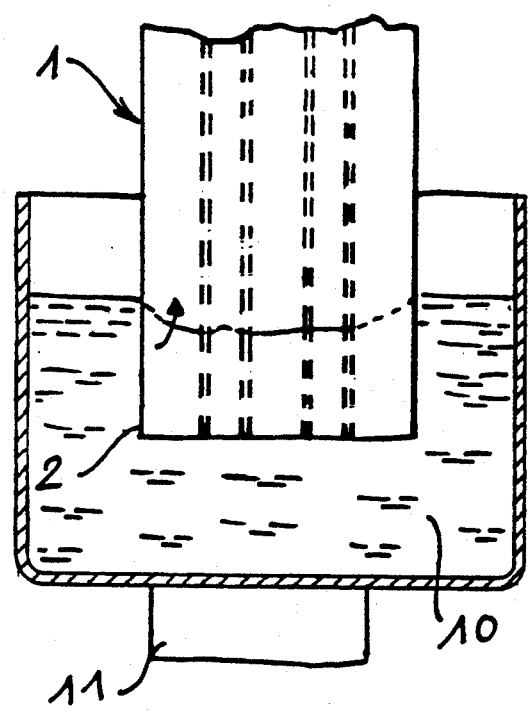
FIG. 5 is a highly diagrammatic view showing one of the stages in the method of manufacturing the membrane device of FIG. 1.

Each of the ends 2 of the macroporous block 1 is impregnated as shown diagrammatically in FIG. 5. The slip is stirred by ultrasound emitted by a generator 11. The impregnated zone reaches a height of 20 mm. The ends 2 of the block 1 are dried and then subjected to firing at 1,500° C. in an oxidizing atmosphere. A zone is thus obtained which is filled with sintered grains 5 (see FIGS. 2 and 3) with residual porosity remaining therebetween. These grains have a mean diameter of 2.5 microns and they constitute "frame" grains.

A 20 micron to 30 micron thick layer 3 of alumina is then deposited in the channels 7 of the macroporous block 1, the alumina having a mean pore diameter of 1 micron. This layer is sintered at a temperature of 1,350° C.

A second filling operation is then performed in analogous manner to the first, but using a slip of boehmite (aluminum hydroxide utilized in this case as a precursor for alumina) having a mean diameter of 0.1 microns. The composition by weight of this slip is:

| boehmite: | 33.0% |
|---|---|
| polymethacrylic acid: | 1.5% |
| water: | 65.5% |

The polymethacrylic acid is used as a wetting agent for deflocculating the boehmite.

Each of the ends 2 of the macroporous 1 is impregnated. The slip is again stirred by ultrasound. The impregnated zone reaches a height of 25 mm. The ends 2 of the block are dried and then fired at 1,150° C. in an oxidizing atmosphere. During firing, the boehmite is transformed into alumina as appears in FIG. 3. A zone is obtained filled with sintered alumina grains 6 having a mean diameter of 0.2 $\mu$m and constituting finishing grains. Observation under a microscope shows that the finishing grains 6 are incorporated in the pores between the frame grains 5.

The measured porosity of the end of the block is 15%, i.e. 37.5% of its initial porosity. Mercury pore diameter measurement performed on the macroporous block end leakproofed in this way gives a mean pore diameter of 0.08 microns.

EXAMPLE 2

To leakproof the end of a variant filter element having multichannel geometry and made of alumina having porosity of 33% with pores having a mean diameter of 10 microns, a first slip is prepared of alumina particles having a mean diameter of 1.0 microns. The composition by weight of this slip is:

| alumina: | 55.0% |
|---|---|
| amino phosphonic acid: | 0.8% |
| polyvinyl alcohol: | 1.0% |
| water: | 43.2% |

The amino phosphonic acid is used as a wetting agent to deflocculate the alumina.

As before, each of the ends of the macroporous block is impregnated. The slip is stirred ultrasonically. The impregnated zone reaches a height of 20 mm. The ends of the block are dried and then fired at 1,350° C. in an oxidizing atmosphere. A zone is obtained at each end which is filled with sintered grains leaving residual porosity therebetween. The mean diameter of these grains is 1.0 micron, and they constitute frame grains 5.

A 20 micron to 30 micron thick layer of alumina 3 having a mean pore diameter of 0.8 microns is then deposited in the channels 7 of the macroporous block. This layer is sintered at a temperature of 1,300° C. A second filling operation is then performed using a slip of zirconia particles having a mean diameter of 0.05 microns. Zirconia is selected because its isoelectric point (iep) of 5.8 pH units is 2.7 pH units distant from the iep of alumina (whose iep is 8.5 pH units). The composition by weight of this slip is:

| zirconia: | 28.0% |
|---|---|
| polymethacrylic acid: | 0.5% |
| water: | 71.5% |

The polymethacrylic acid is used as a wetting agent to deflocculate the zirconia. Each of the ends of the macroporous block is impregnated as described above. The impregnated zone reaches a height of 25 mm. The ends of the block are dried and then fired at 600° C. in an oxidizing atmosphere. A zone is thus obtained which is filled with sintered grains constituting finishing grains 6. Observation under a microscope shows that the finishing grains are incorporated in the residual pores remaining after the first filling operation and that their mean diameter is 0.1 μm, which shows that the grains have grown by a factor of two compared with the initial particles.

The measured porosity of the end of the block is 10%, i.e. 30% of its initial porosity. Mercury pore diameter measurement performed on the leakproofed end of the macroporous block shows that the mean pore diameter is 0.12 microns.

EXAMPLE 3

To leakproof the end of a sintered stainless steel tube (not shown, inside diameter=30 mm; outside diameter=36 mm) having porosity of 20% and a mean pore diameter of 20 microns, a first slip is prepared of titanium oxide particles having a mean diameter of 1.5 microns. The composition by weight of this slip is:

| titanium oxide: | 75.0% |
|---|---|
| phospho-organic ester: | 2.8% |
| water: | 22.2% |

The phospho-organic acid is used as a wetting agent for deflocculating the titanium oxide.

Each of the ends of the tube is impregnated as shown in FIG. 5. The impregnated zone reaches a height of 30 mm. The ends of the tube are then dried and fired at 1,000 C. A zone is obtained which is filled with sintered grains leaving residual porosity therebetween. The mean diameter of these grains is 1.5 microns, and they constitute the frame grains.

A 15 micron thick layer of zirconia having a mean pore diameter of 0.3 microns is deposited inside the tube. This layer is sintered at a temperature of 900° C.

A second filling operation is then performed using a suspension of polytetrafluoroethylene particles having a mean diameter of 0.1 microns (a suspension of the Soreflon 60 type), the suspension including about 58% by weight of the solid.

Each of the ends of the tube is impregnated, but the suspension is not stirred ultrasonically. The impregnated zone reaches a height of 18 mm. The ends of the tube are dried and are then subjected to firing at 370° C. A zone is obtained filled with sintered polytetrafluoroethylene grains having a mean diameter of 0.1 μm, constituting the finishing grains. Observation under a microscope shows that the finishing grains are incorporated in the pores situated between the frame grains.

The measured porosity at the end of the tube is 5%, i.e. 25% of its initial porosity.

Mercury pore diameter measurement performed on the leakproofed end of the macroporous tube shows that the pores have a diameter of 0.05 microns.

EXAMPLE 4

To leakproof a multichannel geometry alumina block analogous to that shown in FIG. 1, having a porosity of 33% and pores with a mean diameter of 10 microns, a slip is prepared including alumina particles having a mean diameter of 1.0 micron and precalcined zirconia particles having a mean diameter of 0.07 microns. The composition by weight of this slip is:

| alumina: | 45% |
|---|---|
| zirconia: | 28% |
| water: | 26% |
| 36N hydrochloric acid: | 1% |

The hydrochloric acid is used as a particle dispersion agent.

Each of the ends 2 of the microporous block is impregnated as described above. The impregnated zone reaches a height of 25 mm. The ends of the block are dried and are then fired at 800° C. in an oxidizing atmosphere. This temperature is determined as a function of the zirconia particles. Observation under a microscope of this zone shows that the finishing grains 6 (zirconia) are incorporated in the residual pores left between the frame grains 5 (alumina). The mean grain diameter after sintering corresponds to the mean diameter of the corresponding particles present in the slip.

The measured porosity of the end of the block is 12%, i.e. 36% of its initial porosity.

Mercury pore diameter measurement performed on the leakproofed end of the macroporous block gives a pore diameter of 0.1 microns.

EXAMPLE 5

Figure 4:
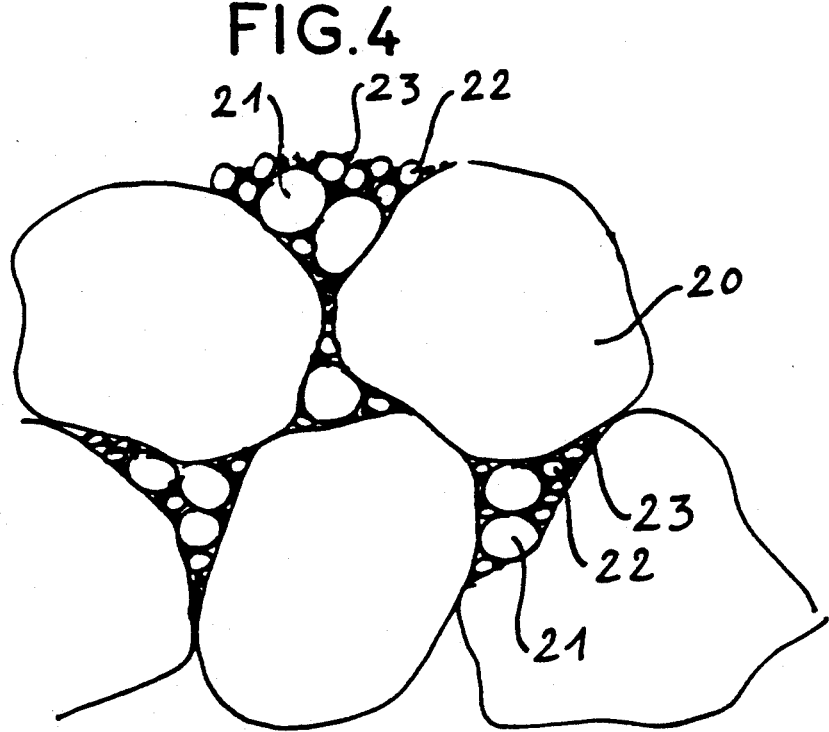
FIG. 4 is a variant of FIG. 3.

To leakproof an alumina block 20 (see FIG. 4) having a porosity of 50% and pores with a mean diameter of 20 microns, a first slip is prepared of titanium oxide particles having a mean diameter of 3.5 microns. The composition by weight of this is:

| titanium oxide: | 75.0% |
|---|---|
| phospho-organic ester: | 2.8% |
| water: | 22.2% |

The phospho-organic acid is used as a wetting agent for deflocculating the titanium oxide. The isoelectric point of the titanium oxide is 4.7 pH units.

Each of the ends of the macroporous block is impregnated. The slip is stirred ultrasonically. The impregnated zone reaches a height of 30 mm. The ends of the block are dried and then fired at 1,200° C. in an oxidizing atmosphere. A zone is obtained filled with sintered grains leaving residual porosity therebetween. The mean diameter of these grains 21 is 3.5 microns and they constitute frame grains.

A 20 micron thick layer of alumina having a mean pore diameter of 0.2 microns is then deposited in the channels of the macroporous block. This layer is sintered at a temperature of 1,200° C.

A second filling operation is then performed using a slip of silica particles having a mean diameter of 0.6 microns. The composition by weight of this slip is:

| | |
|---|---|
| silica: | 45.0% |
| polyacrylic acid: | 1.1% |
| water: | 53.9% |

The polyacrylic acid is used as a wetting agent for deflocculating the silica. The isoelectric point of silica is 2.2 pH units. The selection of silica and titanium oxide as a pair is based on the difference between their isoelectric points (2.6 pH units).

Each of the ends of the macroporous block is impregnated. The slip is stirred ultrasonically. The impregnated zone reaches a height of 25 mm. The ends of the block are dried and then fired at 1,000° C. in an oxidizing atmosphere. This produces a zone filled with sintered grains. Observation under a microscope shows that the intermediate grains 22 (silica) are incorporated in the pores situated between the frame grains 21 (titanium oxide). The silica grains grow a little to reach a diameter of 0.7 microns and residual porosity is left therebetween.

Finally, a third filling operation is performed using a suspension of polytetrafluoroethylene particles having a mean diameter of 0.1 microns (a suspension of the Soreflon 60 type).

Each of the ends of the macroporous block is impregnated, but the suspension is not stirred ultrasonically. The impregnated zone reaches a height of 18 mm. The ends of the block are dried and then fired at 370° C. A zone is obtained which is filled with sintered grains 23. Observation of this zone under a microscope shows an interfitting structure in which the finishing grains (the polytetrafluoroethylene grains) are incorporated in the residual pores between the larger-sized particles. The polytetrafluoroethylene grains retain their initial diameter of 0.1 microns.

The measured porosity at the end of the block is 5%, i.e. 10% of its initial porosity.

Mercury pore diameter measurement performed on the leak-proofed end of the macroporous block gives a mean pore diameter of 0.1 microns.

EXAMPLE 6

To leakproof a tubular alumina block (not shown) having porosity of 40% and a mean pore diameter of 15 μm, a first slip is prepared of alumina particles having a mean diameter of 1.5 microns. The composition by weight of this slip is:

| | |
|---|---|
| alumina: | 63.0% |
| polyacrylic acid: | 0.8% |
| water: | 36.2% |

The polyacrylic acid is used as a wetting agent to deflocculate the alumina.

Each of the ends of the macroporous block is impregnated. The slip is stirred ultrasonically. The impregnated zone reaches a height of 20 mm. The ends of the block are dried and then fired at 1,400° C. in an oxidizing atmosphere. A zone is obtained filled with sintered grains leaving residual porosity therebetween. The mean diameter of these grains is 1.5 microns, and these grains constitute the frame grains.

A 20 micron to 30 micron thick layer of alumina having a mean pore diameter of 0.8 microns is then deposited in the channels in the macroporous block. This layer is sintered at a temperature of 1,300° C.

A second filling operation is then performed using a slip of titanium oxide particles having a mean diameter of 0.2 microns. The composition by weight of this slip is:

| | |
|---|---|
| titanium oxide: | 33.0% |
| polymethacrylic acid: | 1.5% |
| water: | 65.5% |

The polymethacrylic acid is used as a wetting agent to deflocculate titanium oxide.

Titanium oxide is selected since its isoelectric point of 4.7 pH units is 3.8 pH units distant from that of alumina (whose iep is 8.5 pH units).

Each of the ends of the macroporous block is impregnated using the device shown in FIG. 5. The slip is stirred ultrasonically. The impregnated zone reaches a height of 25 mm. The ends of the block are dried and then fired at 1,000° C. in an oxidizing atmosphere. A zone is obtained which is filled with sintered grains having a mean diameter of 0.2 μm and constituting the finishing grains. Observation under a microscope shows that the finishing grains are incorporated in the pores lying between the frame grains.

The measured porosity at the end of the block is 12%, i.e. 30% of its initial porosity. Mercury pore diameter measurement performed on the end of the macroporous block leakproofed in this way gives a mean pore diameter of 0.04 microns.

EXAMPLE 7

To leakproof the end of a variant multichannel filter element of alumina having 33% porosity and a mean pore diameter of 10 microns, and coated with a layer of alumina having a mean pore diameter of 0.8 μm, a first slip is prepared of alumina particles having a mean diameter of 0.3 microns. The composition by weight of this slip is:

| | |
|---|---|
| alumina: | 58.0% |
| amino phosphonic acid: | 1.0% |
| polyvinyl acid: | 1.0% |
| water: | 40.0% |

The amino phosphonic acid is used as a wetting agent to deflocculate the alumina.

Each of the ends of the macroporous block is impregnated as described above. The slip is stirred ultrasonically. The impregnated reaches a height of 20 mm. The ends of the block are dried and then fired at 1,100° C. in an oxidizing atmosphere. A zone is obtained at each end which is filled with sintered grains leaving residual porosity therebetween. The mean diameter of these grains is 0.3 microns and they constitute frame grains 5.

A second filling operation is then performed using a slip of zirconia particles having a mean diameter of 0.01 microns. Zirconia is selected because its isoelectric point of 5.8 pH units is 2.7 pH units distant from the iep of alumina (whose iep is 8.5 pH units). The composition by weight of this slip is:

| | |
|---|---|
| zirconia: | 28.0% |
| polymethacrylic acid: | 0.5% |
| water: | 71.5% |

The polymethacrylic acid is used as a wetting agent for deflocculate the zirconia.

Each of the ends of the macroporous block is impregnated as described above. The impregnated zone reaches a height of 25 mm. The ends of the block are dried and then fired at 500° C. in an oxidizing atmosphere. A zone is obtained which is filled with sintered grains constituting finishing grains 6. Observation under a microscope shows that the finishing grains are incorporated in the residual porosity from the first filling operation and that their mean diameter is 0.02 μm, i.e. that they have grown by a factor of two compared with the initial particles.

The measured porosity at the end of the block is 10%, i.e. 30% of its initial value. Mercury pore diameter measurement performed on the leakproofed end of the macroporous block gives a mean pore diameter of 0.04 microns.

Naturally, the invention is not limited to the examples described. The membranes described in the present invention and in the above examples are used in fields such as filtering liquids or gases, separating gases, or making catalytic reactors.

We claim:

1. A membrane device for filtration, separation, or catalytic reaction, the device comprising:
    a macroporous block of sintered ceramic material, of sintered metal, or of sintered glass, the block being pierced by parallel longitudinal channels whose surfaces are covered by said membrane made of an organic material or a sintered ceramic material or sintered glass, the porosity of the membrane being finer than that of the block;
    means for injecting a fluid to be purified into said channels via first ends thereof;
    means for collecting purified fluid from the lateral surface of said block;
    means for collecting residual fluid from second ends of said channels;
    the pores at both ends of said macroporous block being filled with a porous sintered filler material;
    wherein said filler material comprises at least two types of grain: grains of a first type called "frame" grains having a diameter lying in the range about 1% to about 20% of the diameter of the pores of said block; and grains of the second type called "finishing" grains having a diameter lying in the range about 0.2% to about 20% of the diameter of the frame grains, and being received in the pores defined between said frame grains.

2. A membrane device according to claim 1, wherein the porosity of said ends of said block is less than 50% of the porosity of said block.

3. A membrane device according to claim 1, wherein the mean pore diameter at the ends of said block as measured by mercury porosimetry is less than 0.5 μm.

4. A membrane device according to claim 1, wherein the frame grains are made of ceramic material.

5. A membrane device according to claim 4, wherein the finishing grains are made of ceramic material.

6. A membrane device according to claim 5, wherein said macroporous block, at least one of the layers deposited on the surfaces of its channels, the frame grains, and the finishing grains are all made of a material having the same composition.

7. A membrane device according to claim 6, wherein the material is alumina.

8. A membrane device according to claim 1, wherein the finishing grains are made of an organic polymer.

9. A membrane device according to claim 8, wherein the finishing grains are made of polytetrafluoroethylene.

10. A membrane device according to claim 1, wherein the frame grains and the finishing grains are made of materials having isoelectric points that differ by not less than one unit on the pH scale.

11. A membrane device according to claim 10, wherein said materials have isoelectric points that differ by at least three units on the pH scale.

12. A membrane device according to claim 11, wherein said macroporous block and the frame grains are made of alumina while the finishing grains are made of titanium oxide.

13. A membrane device according to claim 10, wherein said macroporous block and the frame grains are made of alumina while the finishing grains are made of zirconia.

14. A filling method for filling the pores at the ends of the macroporous block of a membrane device according to claim 1, wherein the method comprises:
    a first step during which a first concentrated deflocculated slip of a frame material powder is prepared, the powder being constituted by particles having a mean diameter lying in the range about 0.5% to about 20% of the mean diameter of the pores of the macroporous block, each of the ends of the macroporous block being successively dipped in said slip, dried, and then subjected to frame material consolidation treatment; and
    a second step during which a second concentrated deflocculated slip of finishing material powder is prepared, the powder being constituted by particles having a mean diameter lying in the range about 0.1% to about 20% of the mean diameter of the frame grains, each of the ends of the macroporous block being dipped in succession in said slip, dried, and then subjected to heat treatment for consolidating the finishing material.

15. A filling method according to claim 14, wherein the frame material is a ceramic and the frame material consolidation treatment is sintering.

16. A filling method according to claim 15, in which the finishing material is a ceramic and the consolidation heat treatment is sintering.

17. A filling method according to claim 16, wherein the particles contained in the second slip are particles of a precursor for the finishing material, an additional intermediate step being provided for transforming said precursor into the finishing material.

18. A filling method according to claim 16, wherein said finishing material is sintered in such a manner that the mean diameter of the finishing grains is no greater than twice the diameter of the particles in the corresponding slip.

19. A filling method according to claim 16, wherein said finishing material is sintered in such a manner that the mean diameter of the finishing grains is no greater than 1.5 times the diameter of the particles in the corresponding slip.

20. A filling method according to claim 15, wherein said frame material is sintered in such a manner that the mean diameter of the frame grains is not greater than twice the diameter of the particles in the corresponding slip.

21. A filling method according to claim 20, wherein said finishing material is sintered in such a manner that the mean diameter of the finishing grains is no greater than twice the diameter of the particles in the corresponding slip.

22. A filling method according to claim 20, wherein said finishing material is sintered in such a manner that the mean diameter of the finishing grains is no greater than 1.5 times the diameter of the particles in the corresponding slip.

23. A filling method according to claim 15, wherein said frame material is sintered in such a manner that the mean diameter of the frame grains is not greater than 1.5 times the diameter of the particles in the corresponding slip.

24. A filling method according to claim 14, wherein each slip is stirred ultrasonically.

25. A filling method for filling the pores at the ends of a macroporous block of a membrane device according to claim 1, wherein a concentrated deflocculated slip is prepared of a powder comprising a mixture of frame material powder and of finishing material powder, each of the ends of the macroporous block are dipped in succession in said slip, the ends are dried, and heat treatment is performed to consolidate the finishing material and the frame material.

26. A filling method according to claim 25, wherein the frame material is a ceramic, the finishing material is a ceramic, and the heat treatment for consolidating is sintering.

27. A filling method according to claim 26, wherein said finishing material is sintered in such a manner that the mean diameter of the finishing grains is no greater than 1.5 times the particle diameter of the corresponding powder in the slip.

28. A filling method according to claim 26, wherein said finishing material is sintered in such a manner that the mean diameter of the finishing grains is no greater than twice the particle diameter of the corresponding powder in the slip.

29. A filling method according to claim 25, wherein each slip is stirred ultrasonically.

30. The membrane device according to claim 1, wherein said membrane is permeable by diffusion.

31. The membrane device according to claim 1, wherein said material further comprises a catalyst doping.

32. The membrane device according to claim 1, wherein the porosity of the ends of the block is less than 40% of the porosity of said block.

33. The membrane device according to claim 1, wherein the mean pore diameter at the ends of said block as measured by mercury porosimetry is less than 0.2μm.

34. A membrane device for filtration, separation, or catalytic reaction, the device comprising:
  a macroporous block of sintered ceramic material, of sintered metal, or of sintered glass, the block being pierced by parallel longitudinal channels whose surfaces are covered by said membrane made of an organic material or a sintered ceramic material or sintered glass, the porosity of the membrane being finer than that of the block:
  means for injecting a fluid to be purified into said channels via first ends thereof;
  means for collecting purified fluid from the lateral surface of said block;
  means for collecting residual fluid from second ends of said channels;
  the pores at both ends of said macroporous block being filled with a porous sintered filler material;
  wherein said filler material is constituted by three types of grain: grains of a first type called "frame" grains having a mean diameter lying in the range about 2% to about 20% of the mean diameter of the pores of the macroporous block; grains of a second type called "intermediate" grains having a mean diameter lying in the range about 2% to about 20% of the mean diameter of the frame grains; and grains of a third type called "finishing" grains having a mean diameter lying in the range about 2% to about 20% of the mean diameter of the intermediate grains.

35. A filling method for filling the pores at the ends of a membrane device according to claim 34, wherein the method comprises:
  a first step during which a first concentrated deflocculated slip of a frame material powder is prepared, the powder being constituted by particles having a mean diameter lying in the range 1% to 20% of the mean diameter of the pores of the macroporous block, each of the ends of the macroporous block being successively dipped in said slip, dried, and then subjected to frame material consolidation treatment;
  a second step during which a second concentrated deflocculated slip of intermediate grain powder is prepared, the powder being constituted by particles having a mean diameter lying in the range 1% to 20% of the mean diameter of the frame grains, each of the ends of the macroporous block being dipped in said slip, being dried, and said intermediate grains being consolidated; and
  a third step during which a third concentrated deflocculated slip of finishing material powder is prepared, the powder being constituted by particles having a mean diameter lying in the range about 1% to about 20% of the mean diameter of the intermediate grains, each of the ends of the macroporous block being dipped in succession in said slip, dried, and then subjected to heat treatment for consolidating the finishing material.

36. A filling method according to claim 35, wherein the particles of finishing material in said slip are replaced by particles of a precursor for said finishing material, and an additional intermediate step is provided for transforming said precursor into the finishing material.

37. A filling method according to claim 35, wherein each slip is stirred ultrasonically.

38. The membrane device according to claim 34, wherein the membrane is permeable by diffusion.

39. The membrane device according to claim 34, wherein said material further comprises a catalyst doping.

* * * * *